United States Patent
Jakob

(10) Patent No.: US 9,597,813 B2
(45) Date of Patent: Mar. 21, 2017

(54) METHOD AND DEVICE FOR PRODUCING A STRIPPING TOOL

(71) Applicant: Joachim Jakob, Radolfzell (DE)

(72) Inventor: Joachim Jakob, Radolfzell (DE)

(*) Notice: Subject to any disclaimer, the term of this patent is extended or adjusted under 35 U.S.C. 154(b) by 121 days.

(21) Appl. No.: 14/362,818

(22) PCT Filed: Nov. 30, 2012

(86) PCT No.: PCT/EP2012/074012
§ 371 (c)(1),
(2) Date: Jun. 4, 2014

(87) PCT Pub. No.: WO2013/083477
PCT Pub. Date: Jun. 13, 2013

(65) Prior Publication Data
US 2014/0311311 A1  Oct. 23, 2014

(30) Foreign Application Priority Data

Dec. 5, 2011 (DE) .................. 10 2011 056 061
Dec. 6, 2011 (DE) .................. 10 2011 056 091
Feb. 29, 2012 (DE) .................. 10 2012 101 660
May 3, 2012 (DE) .................. 10 2012 103 858

(51) Int. Cl.
B23P 19/04 (2006.01)
B26D 7/18 (2006.01)
B26F 1/44 (2006.01)

(52) U.S. Cl.
CPC ............... *B26D 7/18* (2013.01); *B23P 19/04* (2013.01); *B26D 7/1818* (2013.01); *B26F 1/44* (2013.01); *Y10T 29/49826* (2015.01); *Y10T 29/53* (2015.01); *Y10T 29/53478* (2015.01); *Y10T 83/2096* (2015.04)

(58) Field of Classification Search
CPC ......... B26D 7/18; B26D 7/1818; B23P 19/04; B26F 1/44; Y10T 83/2096; Y10T 29/49826; Y10T 29/53478; Y10T 29/53
See application file for complete search history.

(56) References Cited

U.S. PATENT DOCUMENTS 3,643,553 A * 2/1972 Morimoto ............ B26D 7/1836
493/373
5,049,122 A   9/1991 Marschke
5,291,652 A   3/1994 Vossen et al.

FOREIGN PATENT DOCUMENTS

DE   41 03 339    9/1992
DE   297 07 792   7/1997

OTHER PUBLICATIONS

International Preliminary Report on Patentability for International Application No. PCT/EP2012/074012 issued Jun. 10, 2014.
International Search Report for International Application No. PCT/EP2012/074012 mailed Mar. 7, 2013.

* cited by examiner

*Primary Examiner* — Ryan J Walters
(74) *Attorney, Agent, or Firm* — Womble Carlyle Sandridge & Rice, LLP

(57) ABSTRACT

The invention relates to a device (1) which is suitable for producing a stripping tool. Said device comprises —a control unit (2), —a receiving portion (3) for a stripper plate (4), —a stripper flat-strip insertion device (5), and —a stripper pin insertion device (6).

16 Claims, 4 Drawing Sheets

METHOD AND DEVICE FOR PRODUCING A STRIPPING TOOL

TECHNICAL FIELD

The invention relates to a device for producing a stripping tool, as well as a method for producing a stripping tool.

BACKGROUND

For stamping and stripping, usually stripper plates are used as the stripping tool, in which stripper pins or stripper flat-strips are inserted. One example of a stripper pin is the crown pin from the company Boxplan. The stripper pin has a circular cross-section.

One example of a stripper flat-strip is a stripper claw. This has a line with two points on its front surface. Normally, stripper flat-strips, due to their small strip-shaped cross-section, can only be placed manually in a stripper plate. For this, a hole is made in the stripper plate, wherein the hole basically corresponds to a cross-section of the stripper flat-strip. Usually, these holes are slits that are laser cut.

In general, the insertion of the stripper pin can be done by machine, because stripper pins are relatively stable. For this, such pins have a conical tapering on an end that is inserted in the stripper plate. In addition, these pins usually have a recess on their surface. The stripper pins are driven directly into the material of the stripper plate at the end where the conical tapering is disposed. This is then deformed. A portion of the material is received in the recess on the surface of the stripper pin.

Alternatively, there is also the case that the pins are placed by means of a machine in a pre-drilled and/or laser cut and/or cut hole. This method, although rare and expensive, is also possible.

Disadvantageously, stripper tools, in which stripper pins and stripper flat-strips are provided, are difficult and complex to produce. In a first step, the slits for the stripper flat-strips are pre-cut.

Then, the stripper pins are manually driven into the stripper plate. Subsequently, the stripper flat-strips are inserted in the slits in the stripper plate by hand.

SUMMARY

An aspect of the invention is the provision of a device for producing a stripper tool with which stripper pins and stripper flat-strips can be inserted in a stripper plate in a simple manner. A method for inserting stripper pins and stripper flat-strips is also provided.

In one aspect of this disclosure, the device for producing the stripping tool includes a control unit and a receiving component for receiving a stripper plate, wherein the device further includes a stripper flat-strip insertion device operatively associated with the control unit for mounting stripper flat-strips to the stripper plate, and/or a stripper pin insertion device operatively associated with the control unit for mounting stripper pins to the stripper plate. In another aspect of this disclosure, a method for producing a stripping tool includes automatically mounting at least one stripper flat-strip in a stripper plate, and/or automatically mounting at least one stripper pin in the stripper plate.

In typical exemplary embodiments, a device for producing a stripping tool comprises a control unit, a receiving component for a stripper plate, a stripper flat-strip insertion device and a stripper pin insertion device. As a result, there is the advantage that stripper flat-strips having a strip-shaped cross-section, and stripper pins having a circular cross-ssection, can be inserted in a stripper plate in a simple manner in a production step. Independently thereof, the concept of the invention also comprises a device by means of which solely automated insertion of stripper flat-strips is available. In addition, the combined automated insertion of stripper flat-strips and stripper pins is also within the scope of the invention.

Preferably, the stripper pin has a cross-section with a diameter of 1 mm-10 mm, preferably between 1.8 mm and 5 mm. By this means, the best stripping results can be obtained. Preferably, a stripper flat-strip has a rectangular cross-section. Preferably, the cross-section of the stripper flat-strip has a thickness of 0.1 mm-3 mm. Preferably, the cross-section of the stripper flat-strip has a length of 2 mm-30 mm. For practical purposes, the cross-section of the stripper flat-strip may have a bend.

In typical exemplary embodiments, the stripper flat-strip insertion device is configured for inserting a stripper flat-strip in a slit already made in the stripper plate. Preferably, the slit corresponds in size to the cross-section of the stripper flat-strip. As a result, there is the advantage that the stripper flat-strips are retained in the slits in a press-fit.

In typical exemplary embodiments, the stripper flat-strip insertion device is configured for removing a stripper flat-strip from a magazine. As a result, there is the advantage that the stripper flat-strips can be retrieved automatically.

In typical exemplary embodiments, the device has a detection means. Preferably, the detection means is configured for identifying the slits in the stripper plate.

Preferably, the term "identifying" is used to mean that the control unit obtains the position from a CAD program, in which all of the positions and types of pins and metal strips have been determined, in terms of their types and positions, in advance.

As a result, there is the advantage that the stripper flat-strips can be inserted automatically, because the slits for receiving the stripper flat-strips are automatically identified.

In typical exemplary embodiments, the stripper pin insertion device is configured for driving a stripper pin into the stripper plate. Preferably, the stripper pin is driven directly into the material, or the surface of the stripper plate. This means that the stripper pins do not fully penetrate the stripper plate, but instead, merely penetrate the surface of the stripper plate to a depth of up to 2 mm, by way of example. Preferably, the stripper plate consists of wood. Other materials, however, are also conceivable, and are within the scope of the present invention.

In typical exemplary embodiments, the stripper pin insertion device is configured for removing a stripper pin from a magazine. As a result, there is the advantage that the stripper pin can be automatically retrieved.

In typical exemplary embodiments, the control unit is configured for controlling the stripper pin insertion device such that the stripper pin can be removed from the magazine and inserted in the stripper plate according to a predetermined plan or design.

In typical exemplary embodiments, the control unit is configured for causing relative movement between the receiving component with the stripper plate and the stripper pin insertion device such that the stripper pin can be inserted according to a predetermined plan or design.

Also within the scope of this disclosure is a method for producing a stripper tool. Preferably, the method comprises the steps: automatic placement of a stripper flat-strip in a stripper plate, and automatic placement of a stripper pin in a stripper plate.

In typical exemplary embodiments, the stripper flat-strips are placed in already existing slits in the stripper plate. As a result, there is the advantage that the stripper flat-strips are not deformed during the insertion, because no large forces need to be exerted on the stripper flat-strips.

In typical exemplary embodiments, the stripper pins are driven directly into the material of the stripper plate. As a result, there is the advantage that the production step of "producing recesses for stripper pins," which was necessary prior to this invention, is omitted. This is possible because the stripper pins have a larger diameter than the stripper flat-strips, and thus are not deformed when they are driven in.

BRIEF DESCRIPTION OF THE FIGURES

The invention shall be described briefly in the following, based on the attached drawings, wherein the individual figures show a schematic depiction of a device according to an embodiment of the invention for producing a stripping tool.

DETAILED DESCRIPTION OF THE EXEMPLARY EMBODIMENT

Figure 1:
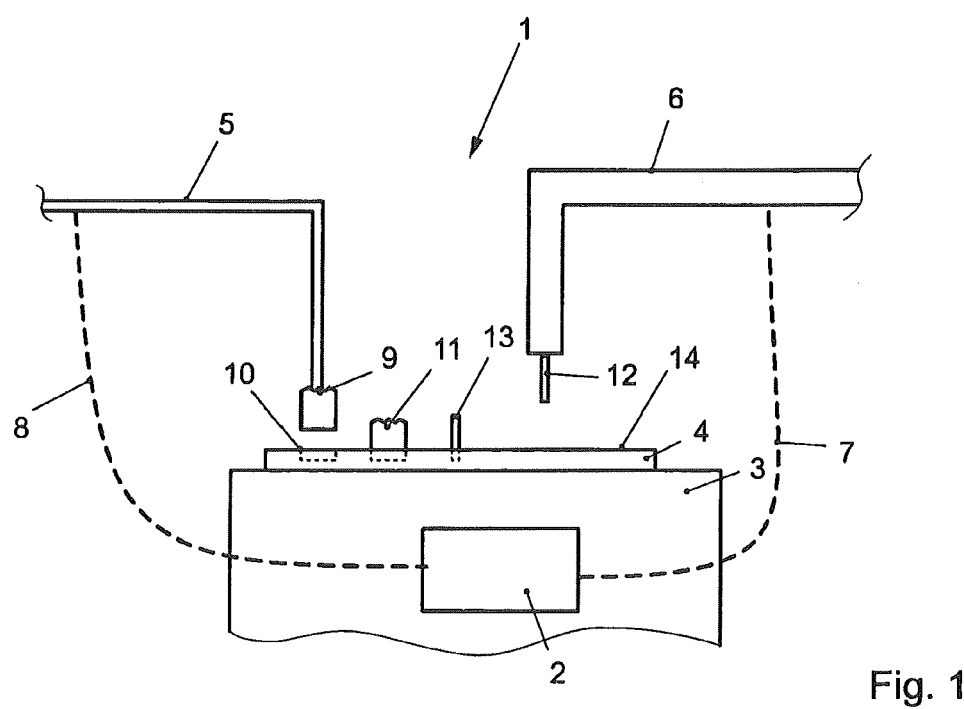
FIG. 1 shows a device 1 according to an exemplary embodiment of the invention, for producing a stripping tool.

The device 1 comprises a control unit 2 and a receiving component 3 for a stripper plate 4. The exemplary embodiment shown in FIG. 1 is configured for providing a combined automated insertion of stripper flat-strips and stripper pins. In addition, this disclosure is also directed to an embodiment that is not shown in the drawings, wherein the device is suitable for inserting stripper flat-strips in a stripper plate. For example and regarding the design shown in FIG. 1, in one method of operation only the device for placing the stripper flat-strips is used.

Furthermore, the device 1 comprises a stripper flat-strip insertion device 5 and a stripper pin insertion device 6.

The stripper pin insertion device 6 is connected to a control unit 2. This connection is depicted by the broken line 7.

Analogously, the stripper flat-strip insertion device 5 is connected to the control unit 2. This connection is depicted by the broken line 8.

The control unit 2 is furthermore connected, in a manner not shown in greater detail, to the receiving component 3, or a traversing unit of the receiving component 3, not shown in greater detail.

The operating mode of the exemplary embodiment of the invention is as follows:

In order to produce a stripping tool, the stripper plate 4 is placed on (e.g., supported by) the receiving component 3. Preferably, slits 10 are made in a surface 14 of the stripper plate 4 at the positions in the stripper plate 4 where a stripper flat-strip 9 is to be inserted.

The position of the slit 10 is conveyed to the control unit 2 by means of a detection device, not shown. Alternatively, the control unit 2 can read out the position of the slit, as well as the type and length of the element that is to be inserted, from a program and/or model, in particular, a CAD program and/or CAD model.

The stripper flat-strips 9 are placed in the slits 10 by the stripper flat-strip insertion device 5.

This procedure is repeated as often as needed for the assembly of the finished stripping tool. The exemplary embodiment in FIG. 1 shows a stripper flat-strip already inserted in (e.g., mounted to) the stripper plate 4.

Further stripper flat-strips can be removed from a magazine, not shown, by means of the stripper flat-strip insertion device 5.

For the positioning of the stripper flat-strip 11 in relation to the stripper plate 4, or the slit 10, preferably the stripper flat-strip insertion device 5 is moved. Alternatively, the receiving component 3, or the stripper plate 4, can be moved in relation to the stripper flat-strip insertion device 5.

When all of the stripper flat-strips have been placed (e.g., mounted), the stripper pin insertion device 6 starts inserting a stripper pin 12 in the stripper plate 4. For this, preferably no holes are present in the stripper plate 4.

In other, not depicted, exemplary embodiments, the stripper pins are placed in pre-cut holes. Although this method is somewhat more expensive, it is less likely to result in damage to the stripper pin.

The stripper pin 2 is driven directly into the stripper plate 4, or the material of the stripper plate 4. The stripper pin 12 does not, however, penetrate all the way through the stripper plate 4.

In order to position the stripper pin 12 in relation to the stripper plate 4, preferably the stripper pin insertion device 6 is moved in relation to the receiving component 3, or the stripper plate 4. Alternatively, the receiving component 3, or the stripper plate 4, can be moved in relation to the stripper pin insertion device 6. The control of this relative movement occurs via the control unit 2.

This procedure can be repeated as often as needed for the assembly of the finished stripping tool.

Further stripper pins can be removed from a magazine, not shown, by the stripper pin insertion device 6. FIG. 1 shows the exemplary embodiment with a stripper pin 13 already inserted.

Figure 2:
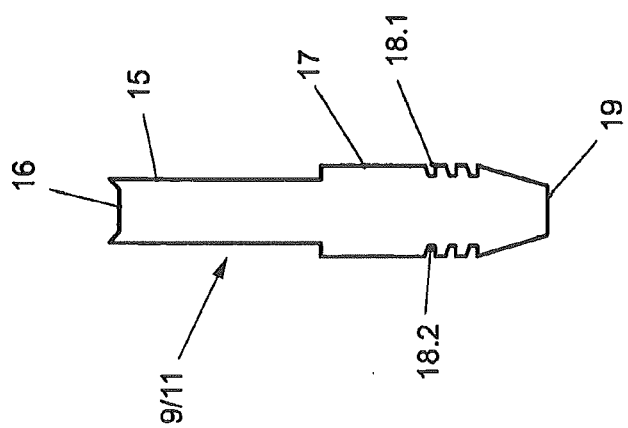

A stripper flat-strip 9/11 is shown in FIG. 2. This stripper flat-strip has a stripper point 15, which has a fluting 16 in this exemplary embodiment, in order to obtain better stripping results. Furthermore, a shoulder 17 is shown. This shoulder 17 can fulfill various tasks. For one thing, for example, the shoulder advantageously enables the stripper flat-strips 9/11 to be better retained by the device 1 according to the invention. Another advantage is that a too deep insertion of the stripper flat-strips 9/11 in the stripper plate 4 is prevented. This is obtained in that the side of the shoulder 17 facing the fluting 16 functions as a stop. In addition, however, stripper flat-strips, which do not have a stop of this type, are also within the scope of this disclosure. In this context, the insertion depths of the stripper flat-strips can also be determined via the traversing path of the drive for the device according to the invention. By this means, it is also possible to place stripper flat-strips at different depths, which is appropriate for modern stripping technology. A further insertion with the shoulder 17 into the stripper plate requires a greater force, which can be programmed such that the device 1 only exerts precisely enough force for the insertion, such that it is not sufficient for overcoming the resistance of the shoulder 17 in the insertion process.

Furthermore, the stripper flat-strips 9/11 have two notches 18.1 and 18.2. These notches 18.1 and 18.2 allow the stripper plate 4 to relax again after the insertion of the stripper flat-strips 9/11 in the stripper plate 4, and these notches 18.1 and 18.2 engage, and prevent the stripper flat-strips 9/11 from slipping out of the stripper plate 4, or having an insufficiently firm seating for serving as a component of the stripping tool. Other exemplary embodiments can have at least one notching.

Lastly, the stripper flat-strips 9/11 have a cutting edge 19. This cutting edge 19 serves as an end of the stripper flat-strip 9/11. The cutting edge 19 is ground in a manner similar to that of a cutting edge on a knife, and facilitates the penetration of the stripper flat-strip 9/11 into the stripper plate 4.

Figure 3:
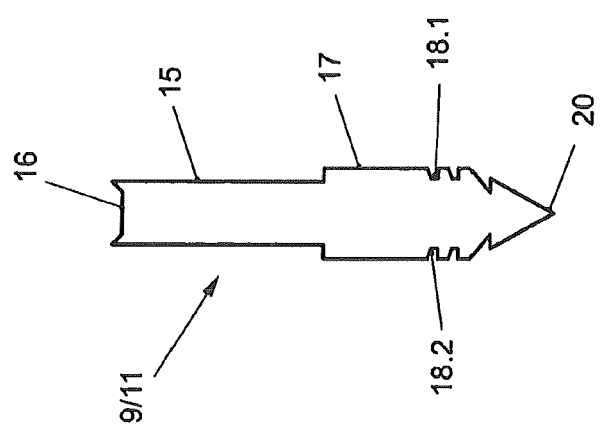
FIGS. 2 and 3 show different exemplary embodiments of stripper flat-strips.

Furthermore, reference is made to FIG. 3. There, the stripper point 15, the fluting 16, the shoulder 17 and the notches 18.1 and 18.2 are shown in the same manner. Because these features concern the same features as those in FIG. 2, reference is made to the explanations pertaining to FIG. 2. However, it should be noted that there is no cutting edge 19 in FIG. 3, but rather, a point 20, which is intended to enable another possibility for the simpler insertion of the stripper flat-strip 9/11 into the stripper plate 4.

Figure 4:
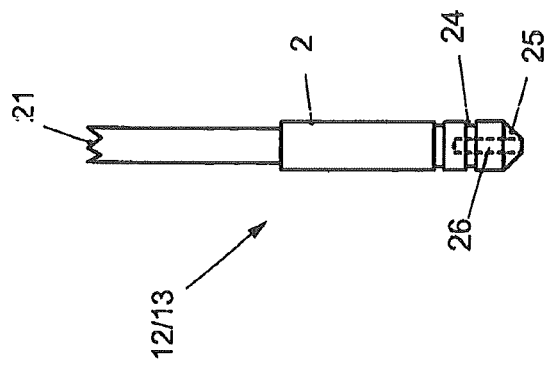
FIG. 4 shows a side view of an exemplary embodiment of a stripper pin according to the invention.

The stripper pin 12/13 in FIG. 4 has a cylindrical design. There as well, a crown-shaped fluting 21, a stripper point 22 and a shoulder 23 are shown, wherein the shoulder 23 of the stripper pin 12/13 does not serve as a stop. Instead, the shoulder 23 of the stripper pin 12/13 is partially inserted into the stripper plate 4.

An encompassing groove 24 is incorporated in the shoulder 23. This groove 24 serves to receive the relaxing stripper plate 4 after the insertion of the stripper pin 12/13 in the stripper plate 4. Furthermore, an end 25 is shown, which runs in a tapering manner away from the fluting 23. At the endpoints of the tapering, the end 25 can also be designed in a manner similar to a cutting edge. Lastly, there is a cavity 26 in the interior of the stripper pin 12/13. This cavity 26 is indicated by a broken line, because it is located in the interior of the stripper pin 12/13.

This cavity has, in turn, various advantages. For one thing, the cavity seeks to reduce any amount of the substance of the stripper plate 4 that is forced out during the insertion of the stripper pin 12/13 in the stripper plate 4. Secondly, the receiving of the substance of the stripper plate in the cavity 26 reinforces the stability of the seating of the stripper pin 12/13 in the stripper plate 4.

Figure 5:
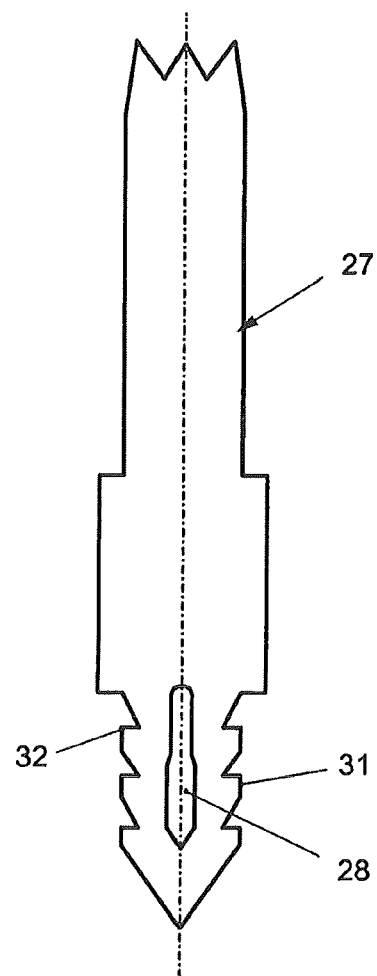
FIG. 5 shows a side view of another exemplary embodiment of a stripper flat-strip according to the invention.

A side view of another exemplary embodiment of a stripper flat-strip 27 according to the invention is shown in FIG. 5. There, a hole 28 has been made in a foot region 31. This hole 38 is intended to serve to receive material of the stripper plate 4 that has expanded back into place after the insertion in the stripper plate 4. By this means, a better anchoring of the stripper flat-strip 27 is obtained. Aside from the hole 28, the foot region 31 exhibits a tooth structure 32.

Apart from this, a shoulder, not identified by a reference numeral, and a stripper point, not identified by a reference numeral, are shown.

Figure 6:
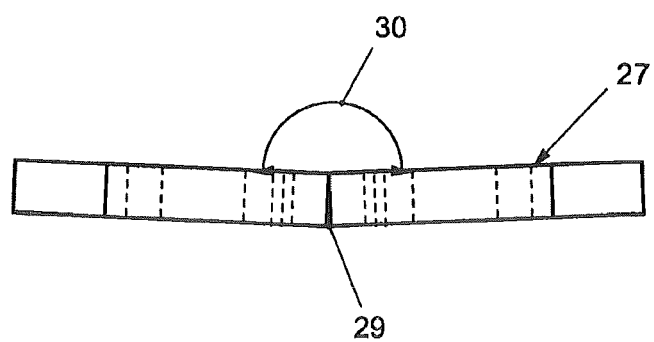
FIG. 6 shows a top view of the stripper flat-strip according to FIG. 5.

FIG. 6 shows a top view of the stripper flat-strip 27 according to FIG. 5. It can be readily seen here that the stripper flat-strip 27 has a bend 29, and an angle 30, basically in the middle of the longitudinal extension thereof.

Figure 7:
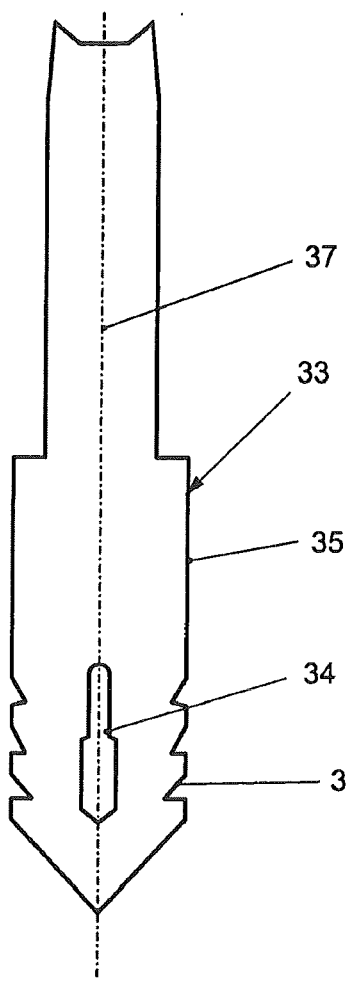
FIG. 7 shows a side view of another exemplary embodiment of a stripper flat-strip according to the invention.

A side view of another exemplary embodiment of a stripper flat-strip 33 according to the invention is shown in FIG. 7. The stripper flat-strip 33 has, in addition to another hole 34 in an additional shoulder 35, which has a toothed structure 36, a curvature 37. This curvature 37 can be readily discerned in FIG. 8, which shows a top view of the stripper flat-strip 33.

Figure 8:
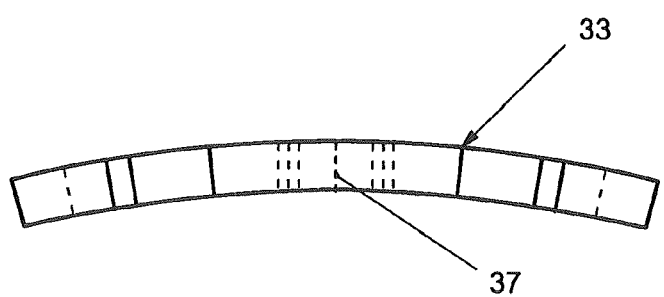
FIG. 8 shows a top view of the stripper flat-strip according to FIG. 7.

The curvature 37 shown in FIGS. 7 and 8 concerns merely one exemplary embodiment among others. It is equally conceivable that a stripper flat-strip according to the invention has numerous curvatures. In the same manner, a stripper flat-strip according to the invention can have numerous bends. Lastly, it is conceivable that a combination of individual or numerous bends and curvatures are formed in a stripper flat-strip according to the invention.

The invention claimed is:

1. A method for producing a stripping tool, comprising:
   arranging a stripper plate on a receiving component;
   forming at least one slit along a surface of the stripper plate at a prescribed position;
   locating a stripper flat-strip in relation to the at least one slit or the stripper plate through relative motion between a stripper flat-strip insertion device connected to the stripper flat-strip and the stripper plate or the receiving component;
   placing the stripper flat-strip into the at least one slit of the stripper plate to connect the stripper flat-strip thereto;
   upon placement of the stripper flat-strip into the at least one slit of the stripper plate, positioning at least one stripper pin along the stripper plate by movement of a stripper pin insertion device with respect to the stripper plate or the receiving component; and
   urging the at least one stripper pin into at least a portion of the stripper plate sufficient to mount the at least one stripper pin to the stripper plate.

2. The method of claim 1, further comprising forming a plurality of slits along the surface of the stripper plate at a series of predetermined locations.

3. The method of claim 2, placing at least one stripper flat strip into each of the plurality of slits formed along the surface of the stripper plate.

4. The method of claim 1, further comprising automatically mounting a plurality of stripper pins to the stripper plate.

5. The method of claim 4, further comprising:
   forming a plurality of holes in the stripper plate; and
   driving each stripper pin of the plurality of stripper pins into a corresponding hole of the plurality of holes.

6. The method of claim 1, further comprising driving a plurality of stripper pins directly into at least a portion of the stripper plate.

7. The method of claim 1, further comprising removing the stripper flat-strip from a magazine using the stripper flat-strip insertion device.

8. The method of claim 1, further comprising removing the at least one stripper pin from a magazine using the stripper pin insertion device.

9. The method of claim 1, further comprising:
   identifying a portion of the at least one slit in the stripper plate; and
   conveying the position of the at least one slit to a control unit.

10. The method of claim 1, wherein the stripper flat-strip comprises a stripper point that has a fluting.

11. The method of claim 1, wherein the stripper pin comprises a groove and a cavity on an end thereof.

12. The method of claim 1, wherein the stripper flat-strip comprises a shoulder configured to enable the stripper flat strip to be retained by the stripper flat-strip insertion device or to control an insertion depth of the stripper flat-strip into the stripper plate.

13. The method of claim 1, wherein the stripper flat-strip comprises one or more notches formed therein to enable relaxation of the stripper plate after connection of the stripper flat-strip thereto.

14. The method of claim 1, wherein the stripper flat-strip has a cutting edge that facilitates penetration of the strip flat-strip into the stripper plate.

15. The method of claim 1, further comprising at least partially inserting a shoulder of the stripper pin into the stripper plate.

16. The method of claim 15, wherein the shoulder of the stripper pin comprises a groove at least partially defined therein to facilitate relaxation of the stripper plate after insertion of the stripper pin into the stripper plate.

* * * * *